United States Patent [19]

Williams et al.

[11] Patent Number: 4,816,097

[45] Date of Patent: Mar. 28, 1989

[54] METHOD OF MANUFACTURING A NON-METALLIC CORE HAVING A PERFORATED SEPTUM EMBEDDED THEREIN

[75] Inventors: Charles J. Williams, Wichita; Robert A. Coleman, Mulvane, both of Kans.

[73] Assignee: The Boeing Company, Seattle, Wash.

[21] Appl. No.: 178,006

[22] Filed: Apr. 5, 1988

[51] Int. Cl.$^4$ .................. B32B 31/12; B32B 31/28; B23K 26/18; E04B 1/84
[52] U.S. Cl. .................. 156/247; 156/253; 156/272.8; 156/279; 156/334; 156/344; 181/292; 219/121.71; 219/121.72; 428/116
[58] Field of Search ............ 156/155, 247, 253, 272.8, 156/290, 279, 334, 344; 264/156; 181/292; 428/116; 219/121.67, 121.7, 121.71, 121.72

[56] References Cited

U.S. PATENT DOCUMENTS

| | | | |
|---|---|---|---|
| 3,742,182 | 6/1973 | Saunders | 219/121.71 |
| 3,770,529 | 11/1973 | Anderson | 156/272.8 |
| 4,257,998 | 3/1981 | Diepenbrock | 264/156 |
| 4,265,955 | 5/1981 | Harp | 428/116 |
| 4,594,120 | 6/1986 | Bourland | 156/155 |
| 4,716,270 | 12/1987 | Gnanamuthu | 219/121.7 |
| 4,759,964 | 7/1988 | Fischer | 428/116 |

*Primary Examiner*—Michael W. Ball
*Assistant Examiner*—J. Davis
*Attorney, Agent, or Firm*—Finnegan, Henderson, Farabow, Garrett & Dunner

[57] ABSTRACT

A method of manufacturing a non-metallic honeycomb having a perforated septum embedded therein in a plane extending perpendicularly to cell walls of the honeycomb, the cell walls of the honeycomb each having discontinuous opposite outer edge surfaces, including the steps of protecting the cell walls with a protectant mixture applied to one of the outer edge surfaces; and laser drilling the septum with a plurality of laser beams originating from a point exterior to the cell walls opposite the covered edge surface in a direction parallel to said cell walls and perpendicular to the plane of the septum, the protectant mixture covering an area of the outer edge surface sufficient to prevent damage to the cell walls.

9 Claims, 3 Drawing Sheets

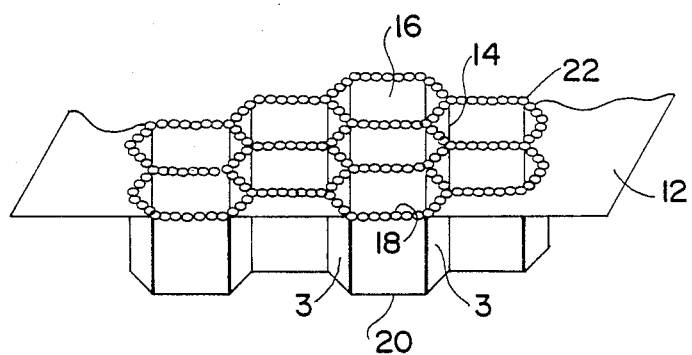
Fig. 2
Fig. 3
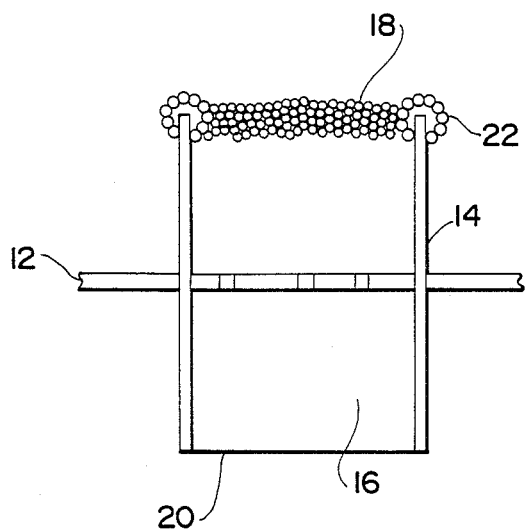

METHOD OF MANUFACTURING A NON-METALLIC CORE HAVING A PERFORATED SEPTUM EMBEDDED THEREIN

FIELD OF THE INVENTION

The invention relates to a method of manufacturing a cellular structure; and more particularly to a method of making a cellular structure having a perforated septum.

DISCUSSION OF THE RELEVANT ART

The use of acoustical material for muffler systems, sound studios, and for soundproofing generally, is well-known. Particularly, a metallic honeycomb cellullar core structure having a perforated septum has been proposed as a muffler component for engines in the aircraft industry. The metallic honeycomb having a perforated septum embedded therein (hereafter "honeycomb-septum") is typically sandwiched between inner and outer layers, which act to provide additional structural integrity and acoustic barriers. For example, a typical acoustical panel structure will include an inner perforated skin or layer comprising aluminum or graphite, followed by the honeycomb-septum, and subsequently followed by an outer skin or layer of graphite. The acoustical panel when installed between the noise source and an adjacent area acts to dampen the transmission of sound, and hence provide a more peaceful and serene atmosphere in the protected area.

The metallic honeycomb cellular core component of the honeycomb-septum acoustical panels is formed by any of the conventional heretofore known techniques. Thus, for purposes of the discussion herein there is used a preformed metallic honeycomb cellular core structure which consists of a plurality of contiguous cells open at both ends. Each cell shares a plurality of cell walls with its contiguous neighbors. The axes of the individual cells are all substantially parallel to one another. The material most often used to manufacture the metallic honeycomb core component is aluminum.

Typically, the first step involved in making the honeycomb-septum is that the preformed metal honeycomb component is pressed down into a first layer of a pliable septum material such as epoxy resin, for example, in the same fashion as a cookie cutter is pressed down into rolled dough. The depth to which the septum will extend into the metallic honeycomb component is controlled by placing a second pliable layer of material, such glyconol wax, for example, underneath the septum material, so that when the honeycomb component is pushed down through the septum material and through the second layer, the septum is thereby embedded, to a predetermined depth, within the honeycomb component. Thus, the septum is in a plane substantially perpendicular to the axes of the honeycomb cells. The second pliable layer of material may be then removed from the honeycomb or remain thereon for further processing.

In order to perforate the septum thereby embedded within each one of the individual contiguous cells of the metallic honeycomb in an efficient and cost-effective manner, an assembly of laser beams is utilized, which laser beams are spaced a distance corresponding to the desired spacing of the perforations, with the number of individual laser beams depending on the area of the septum to be perforated. The honeycomb with embedded septum is then placed under the laser beams whose axes are parallel to the cells' axes, and perpendicular to the plane of the septum material embedded in the honeycomb. After positioning the honeycomb structure, the laser beam source is switched on and the plurality of laser beams act in a predetermined fashion on the septum material to perforate the same. The formed honeycomb-septum structure may then be incorporated into an acoustic panel as discussed above.

Because of the spacing of the desired perforations, and inaccuracies inherent in the laser beam assembly as it acts upon the honeycomb with embedded septum, several of the laser beams may, on occasion, strike the metal cell walls of the honeycomb structure. However, the laser beams do not cause structural damage to the metal cell walls, since they are merely reflected therefrom.

In order to provide a light weight, electrically insulated honeycomb-septum, it is proposed to use a honeycomb core component manufactured of non-metallic material instead of the traditional metallic honeycomb core component. However, in perforating a septum embedded therein there is the problem in that the cell walls do not reflect the laser beams and, in fact, the laser beams can destroy and/or tear the cell walls. This has the deleterious effect of creating holes or gaps in those portions of the cell walls which may abut the inner or outer skins used to create the aforementioned "sandwiched" acoustic panel. The effects of this are two-fold. First, the structural integrity of the panel is lessened because of the lack of surface contact between the cell wall and inner/outer skin. Secondly, the sound dampening effectiveness of a panel is decreased as a result of the large gaps formed between the cell wall and inner/outer skin. Accordingly, there is presently a need to develop a method of manufacturing non-metallic honeycomb-septum structures without the aforementioned deficiencies.

SUMMARY OF THE INVENTION

The objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is disclosed a method of manufacturing a non-metallic honeycomb having a perforated septum extending perpendicular to the non-metallic cell walls of the honeycomb, the cell walls of the non-metallic honeycomb each having opposite edges, separated by the perforated septum, including:

covering one of the opposite edges of the non-metallic core with a substance having the capability of absorbing the power and reflecting the heat of laser energy applied to the septum, the substance covering an area sufficient to interrupt a laser beam incidentally directed at the edges of a cell wall, and directing a plurality of laser beams originating from a point exterior to the cell walls in a direction parallel to the cell walls and perpendicular to a plane containing the septum for a time sufficient to perforate the septum.

In another aspect of the invention the step of covering comprises applying a first coating of at least one adhesive binder to the top portion of the cell walls of a non-metallic honeycomb having a septum embedded therein; and applying a second coating of at least one type of particulate material to the first coating to form a protectant mixture.

In still another aspect of the invention the step of covering comprises applying a protectant mixture of at least one adhesive binder and at least one type of particulate material to a top portion of the cell walls of a non-metallic honeycomb having a septum embedded therein.

The invention consists in the novel methods and products shown and described. The accompanying drawings, which are incorporated in and constitute a part of the specification, illustrate various aspects of the invention and, together with the description, serve to explain the principles of the invention.

BRIEF DESCRIPTION OF THE DRAWINGS

FIG. 2 is a fragmentary perspective view of the honeycomb structure with the protectant mixture according to the present invention applied on the edge surface of the non-metallic cell walls.

FIG. 3 is a cross section taken along line 3—3 of FIG. 2, showing a single cell having a perforated septum with the protectant mixture applied to the edge surface thereof.

DESCRIPTION OF THE PREFERRED EMBODIMENTS

The present invention is concerned with the method of manufacturing a non-metallic cellular structure having a perforated septum, which includes the step of providing a unitary cellular structure having a septum dividing the opposite edge surfaces of the cells.

Figure 1:
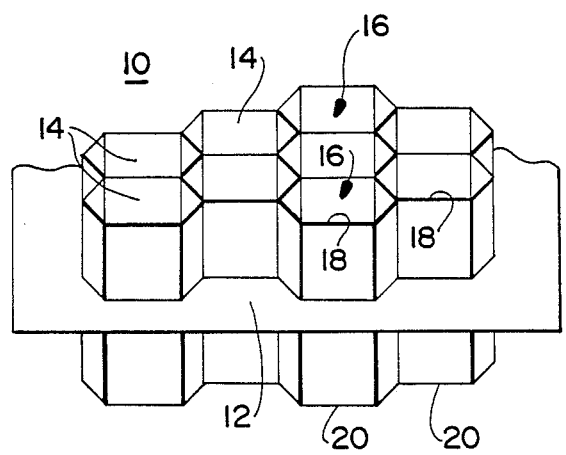
FIG. 1 is a perspective view of a unitary non-metallic honeycomb structure prior to perforation of the septum.

Referring to FIG. 1, and as embodied herein, there is provided a unitary non-metallic honeycomb structure generally referred to as 10 having a planar septum 12 extending perpendicularly to the plane containing walls 14 of individual open cells 16. Septum 12 is disposed at a predetermined distance from each of the outer opposite edge surfaces 18, 20 of cells 16. Outer edge surfaces 18, 20 are discontinous and extend in parallel planes defining the outer limits of structure 10. The planes of surfaces 18, 20 in turn are parallel to the plane of septum 12.

The non-metallic honeycomb structure 10 may be constructed by any of the known methods of manufacturing honeycomb structures, including, but not limited to, molding. The non-metallic material may be selected from any non-metallic material. Preferably, the non-metallic material is selected from the group consisting of fiberglass, nomex, polyimide and graphite. More preferably, the non-metallic material is nomex or fiberglass.

As here embodied, the septum 12 is embedded in the non-metallic honeycomb, at a predetermined depth, in a fashion similar to that described earlier. Specifically, the preformed non-metallic honeycomb component is pressed down into a first layer of a pliable septum material such as epoxy resin, for example, in the same fashion as a cookie cutter is pressed down into rolled dough.

The depth to which the septum will extend into the non-metallic honeycomb component is controlled by placing a second pliable layer of material, such glyconol wax, for example, underneath the septum material, so that when the honeycomb component is pushed down through the septum material and through the second layer, the septum is thereby embedded, to a predetermined depth, within the honeycomb component. Thus, the septum is in a plane substantially perpendicular to the axes of the honeycomb cells. The second pliable layer of material may be then removed from the honeycomb or remain thereon for further processing.

Septum materials may be selected from the group consisting of epoxy adhesives and resins. The material preferably used for the septum is epoxy adhesive. The second pliable layer material may be any wax or paraffin. Preferably, glyconol wax is used as the second pliable layer.

In accordance with the invention, the method provides for covering one of the open opposite edge surfaces 18, 20 of the cells 16 with a material capable of absorbing the power and reflecting the heat of a laser beam.

As embodied herein, and referring to FIGS. 2 and 3, a protectant mixture 22 is shown covering an edge surface 18 of cell walls 14 to protect the cell walls from laser beams incidentally making contact therewith during laser drilling of septum 12 with a plurality of beams. As used herein, laser beams encompass any high energy concentration beam capable of perforating septum 12.

The step of covering may include first applying a coating of at least one adhesive binder selected from the group consisting of a styrene butadiene rubber system modified with a hydrocarbon resin, modified styrene ethylene butylene rubber, and modified styrene butadiene rubber. Preferably, only one of the aforementioned adhesive binders is utilized in any one application. However, mixtures or combinations thereof, as well as any other post-cure soluble resins or adhesives which may be dissolved from or readily removed from or cut off the core without weakening the core are acceptable and within the scope and spirit of the invention.

The first coating of at least one adhesive binder is typically applied to the outer edge surfaces 18 or 20 of the cell walls 14 to a thickness of between 0.0025 to 0.0050 inches. Preferably, the first coating is applied to a thickness of approximately 0.0035 inches.

Then, a second coating of at least one type of particulate material is applied to the first coating on the cell-walls 14 of the non-metallic honeycomb 10 to complete the protectant mixture 22. Preferably, the particulate material may be any material as hard as, or harder than, aluminum. More preferably, the particulate material is selected from the group consisting of silica sand, aluminum, and steel.

The density of the particulate material may vary from dust or shot to chips. Specifically, the particulate density may vary from 0.0025 lb/in$^3$ for silica sand to 0.023 lb/in$^3$ for steel wire shot. To the extent that the particulate material is generally spherical its diameter may vary from 0.0015 to 0.0050 inches.

As further embodied herein, particulate powder may be used for density enhancement of the protectant mixture 22, as the finer particles of the powder are capable of filling gaps between larger, denser particulate material. Preferably, powder particulate material useful in the present invention is selected from the group consisting of titanium dioxide, aluminum powder and iron oxide.

The coloration and thixotropic powders, titanium dioxide and aluminum powder, provide heat reflection and improve the lubricity of the protectant mixture 22 for easier application to the edges 18, 20 of the cell walls 14. Specifically, titanium dioxide provides bright, white coloration for high reflectivity and requires no further additives. Aluminum powder, on the other hand, provides metallic coloration for moderate reflectivity but requires the addition of cab-o-sil to improve handling. Iron oxide which achieves good penetration protection provides marginal to poor heat protection.

If used, the powder particulate material is preferably mixed in with the other denser particulate material prior to application of the second coating to the first coating on the edges 18 or 20 of cell walls 14. However, it will be recognized that other variations and modifications are possible.

Also, the adhesive binder, particulate material and any particulate powder may be mixed prior to application to the outer edge surfaces 18, 20 of cell walls 14 so that fewer application steps are involved. The protectant mixture 22 may be mixed by any well-known conventional means. One advantage to mixing the adhesive binder and particulate material prior to application of the resulting protectant mixture 22 to the cell walls 14 is that the adhesive is uniformly dispersed throughout the particulate material, resulting in a stronger bond between the honeycomb cell walls 14 and the protectant mixture 22.

A preliminary adhesive binder layer may also be applied to the edges 18 or 20 of cell walls 14 prior to application of a second layer comprising a protectant mixture 22, to further strengthen the bond between the edges 18 or 20 of cell walls 14 and the protectant mixture 22.

The relationship between the size of non-metallic honeycomb core cells 16, the core cell strength, the septum depth and the amount of protectant mixture 22 will now be described. The open area (cell diameter) of individual core cells 16 predetermines the surface area available for laser drilling and therefore predetermines the laser-strike pattern density to achieve a given percentage open area (POA). The denser the strike pattern the stronger and more heat resistant the protectant mixture 22, must be in order to minimize the heat affected zone in the protectant mixture 22 so that its cratering due to melt-back does not extend into adjacent strike zones and expose the cell walls 14 to incidental contact by the laser beams. The denser the strike pattern, the more resilient and stronger the protectant mixture 22 must be in order to adhere to the cell walls 14 while undergoing slower laser drilling (machining) time for a given area at increased mechanical and air pressures as well as increased temperature.

The protectant mixture's strength relative to the core cells 16 size is measured by particulate hardness and density as well as by the amount of total protectant mixture 22 applied. Adhesive and tensile strength of the adhesive binder may also be varied in tension with respect to protectant mixture 22 removal process parameters for removing the protectant mixture 22 once the laser drilling is completed.

The stiffness and thickness of the cell walls 14 of the non-metallic honeycomb 10 are key determinants of the honeycomb's strength. Lighter, lesser load-bearing honeycomb tends to be less stiff and is subject to greater damage during laser drilling. Thus, when a lighter non-metallic honeycomb is used a thicker and/or denser core protectant mixture 22 is required.

The septum 12 (drill surface) determines the individual focal points of the laser beams. When the drilling surface is close to the edge surfaces 18, 20 of the cell walls 14, or surface to be protected, the protectant mixture 22 must be denser, thicker and have a higher tensile strength in order to function closer to the laser beams' focal point where the beams' power is most concentrated.

With reference to FIGS. 2 and 3, the thickness of the protectant mixture 22 surrounding the edge surfaces 18, 20 of the core cell wall 14 will be generally determined in accordance with the core cell size, the core strength and the septum depth, in order to adequately protect the cell walls 14. FIG. 3 also shows the non-metallic honeycomb 10 of the present invention with the protectant mixture 22 and with a septum 12 that has been perforated.

The invention includes directing a plurality of laser beams originating from a point exterior to the cell walls in a direction parallel to the cell walls and perpendicular to a plane containing the septum for a time sufficient to perforate the septum.

Figure 4:
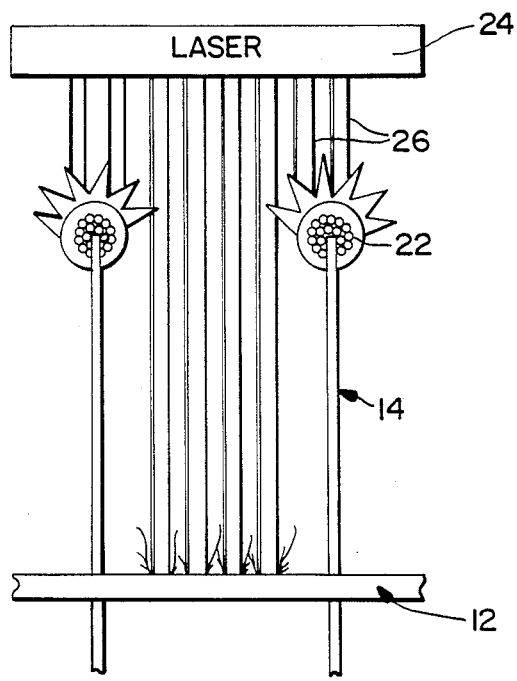
FIG. 4 is an enlarged fragmentary schematic view of the septum being perforated by a plurality of laser beams, further illustrating the laser beams striking the protectant material applied to the edge surface of a cell wall.

As shown in FIG. 4, once the cell walls 14 are covered with the protectant mixture 22 the laser 24 will direct a plurality of laser beams 26 substantially parallel to the cell walls and substantially perpendicular to the plane containing septum 12, to obtain the desired perforation of the septum. The spacing of the laser beams will necessarily determine the spacing of the perforations. The protectant mixture 22 protects the cell walls 14 from the laser beams 26, thereby preventing core cell wall tearing and mutilation.

The first and second coatings of the aforementioned invention may be applied by any conventional means, including rolling, dipping, brushing, or spraying. Preferably, the first coat is applied by spraying while the second coat is applied by dipping the coated area into the particulate material to form a protectant mixture 22 covering the edge surfaces 18 or 20 of the cell walls 14.

Preferably, it will generally be necessary, depending upon the ultimate end use of the non-metallic honeycomb septum, to remove the protectant mixture 22 from the cell walls 14. As discussed above, the adhesive binder is preferably any post-cure soluble resin or adhesive which may be dissolved or cut off from the core without weakening the core.

Preferred removal methods include cutting, peeling, or dissolving of the protectant mixture 22. Solvents which may be used to dissolve the protectant mixture 22 from the cell walls 14 include such typical solvents as trichloroethylene, commonly used at a temperature of approximately 195° F. for dissolving the adhesive. The non-metallic honeycomb 10 and protectant mixture 22 are preferably placed in the solvent with the protectant mixture 22 side down so that it will go into solution away from the cell walls of the honeycomb. Advantageously, the protectant mixture 22 once removed may be processed further and used again. Generally, any solvent which does not deleteriously effect the non-metallic honeycomb 10 and perforated septum may be used.

It may be desirable to add releasing agents to the cell walls 14 prior to application of the binder adhesive to facilitate the removal step. For example, glyconol wax can be used, which facilitates release of the protectant mixture 22 during the aforementioned removal step. Glyconol wax was also used, as discussed above, to insert the septum 12 to a predetermined depth within the honeycomb prior to perforation thereof.

The following example further illustrates an embodiment of the present invention. The example should in no way be considered limiting, but is merely illustrative of the various features of the present invention.

EXAMPLE 1

The non-metallic honeycomb consisted of a six-pound density core made of a phenolic-coated fiberglass having a ⅛" cell size with the drilling surface 0.350" down from the core cell wall top. A very thin, transparent film residue of glyconol wax was left on the core after insertion of the septum. The gylconol wax acts as a mild protectant and a release. The top edge surfaces of the cell walls of the core were covered by one thin layer of plain low tensile adhesive, modified styrene ethylene butylene rubber, having a thickness of approximately 0.0035". The low tensile adhesive acts as a tackifier. Both yield rapidly to vapor degreasing which allows faster removal of the protectant mixture and therefore less exposure of the core cell walls to solvents which attack the core properties. The protectant mixture consisted of approximately a 1:1 ratio of modified styrene butadiene rubber adhesive and sand particulate material (approximately 66% of 0.0025" diameter and approximately 33% of 0.0035" diameter) with about 1% titanium dioxide. The protectant mixture was rolled onto the core cell edge surface with a paint roller to a width of approximately 0.03" (not including the nominal wall thickness of the core) and a height of about 0.025" on the top of the cell wall and permitted to hang down each cell wall wherever it would, but not to the drill surface. The septum was then drilled by laser to achieve an approximately 2.10% open area using 0.006" to 0.008" diameter holes. The protectant worked very well with no damage occuring deeper than 0.0015" to the core cell wall edge surfaces, and only where it had not been applied to the standard thickness noted above. Subsequent to the laser drilling process, the protectant mixture was removed in a vapor degreaser by placing the protectant mixture side down so that it would go into solution away from the core cell walls. The core was allowed approximately four solvent dips of up to 30 seconds apiece.

What is claimed is:

1. A method of manufacturing a non-metallic cellular structure having a perforated septum, comprising the steps of
   providing a unitary non-metallic cellular structure having cells and a septum dividing open opposite edge surfaces of said cells;
   covering one of said open opposite edge surfaces of said cells with at least one type of particulate material capable of absorbing the power and reflecting the heat of a laser beam; and
   directing a plurality of spaced laser beams toward said septum and said cells having the covered open edges for perforating said septum with a plurality of spaced holes corresponding to said spaced laser beams.

2. The method of claim 1, further comprising the step of removing said covering from said cells after perforation of said septum.

3. The method of claim 1, wherein the step of providing the unitary non-metallic cellular structure and septum, comprises the substeps of:
   forming a non-metallic structure comprised of a plurality of contiguous cells open at opposite ends,
   providing a planar layer of non-metallic material in a pliant state,
   pressing one open end of said non-metallic structure through said pliant material a predetermined distance, thereby forming said septum.

4. The method of claim 1, wherein the step of covering comprises the substeps of:
   providing a mixture of at least one adhesive binder and said at least one type of particulate material; and
   applying said mixture to one of said open opposite edge surfaces of said cells.

5. The method of claim 1, wherein the step of covering comprises the substeps of:
   applying a first coating of at least one adhesive binder to one of said open edge surfaces of said cells, and
   applying said at least one type of particulate material to said first coating for adhering said particulate material to said one of said open edge surfaces.

6. The method of claim 4, wherein said step of providing said mixture comprises the substeps of mixing at least one adhesive binder selected from the group consisting of a styrene butadiene rubber system modified with a hydrocarbon resin, modified styrene ethylene butylene rubber and modified styrene butadiene rubber with said at least one type of particulate material.

7. The method of claim 4, wherein said at least one adhesive binder is selected from the group consisting of a styrene butadiene rubber system modified with a hydrocarbon resin, modified styrene ethylene butylene rubber and modified styrene butadiene rubber.

8. The method of claim 6, wherein said at least one type of particulate material is selected from the group consisting of silica sand, aluminum and steel.

9. The method according to claim 8, wherein said at least one type of particulate material further comprises particulate powder of at least one compound selected from the group consisting of titanium dioxide, aluminum powder an iron oxide, wherein when said aluminum powder is chosen the further addition of cab-o-sil is required.

* * * * *

UNITED STATES PATENT AND TRADEMARK OFFICE
CERTIFICATE OF CORRECTION

PATENT NO. : 4,816,097

DATED : March 28, 1989

INVENTOR(S) : Charles J. Williams, et al.

It is certified that error appears in the above-identified patent and that said Letters Patent is hereby corrected as shown below:

Column 4, line 50, after "cell" delete the dash (-);

Column 4, line 51, before "walls" delete the period (.);

Column 7, line 13, change "1/8" to --3/8--;

Claim 9, line 5, change "an" to --and--.

Signed and Sealed this

Twenty-eighth Day of November 1989

Attest:

JEFFREY M. SAMUELS

Attesting Officer          Acting Commissioner of Patents and Trademarks